July 28, 1959        W. C. MORRIS        2,897,407
NEGATIVE-PHASE-SEQUENCE RESPONSIVE APPARATUS
Filed Nov. 3, 1953
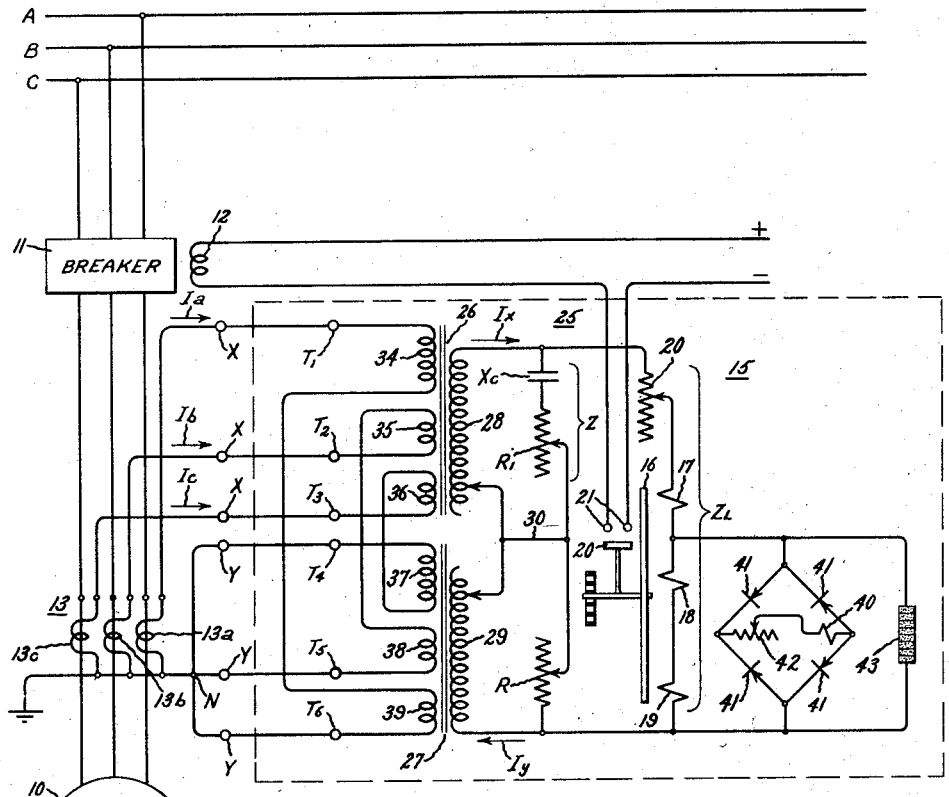
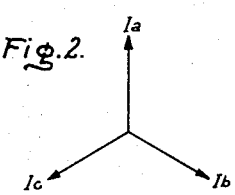
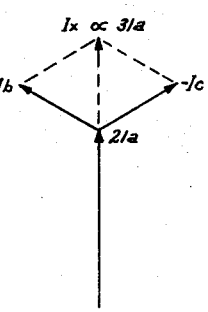
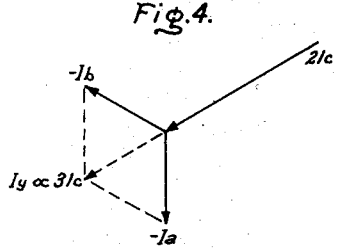
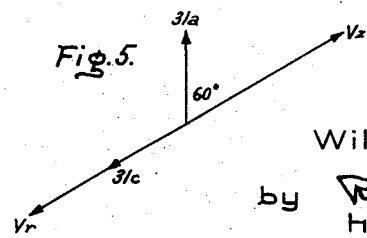
Inventor:
William C. Morris,
by Raymond A. Miles
his Attorney.

United States Patent Office 2,897,407
Patented July 28, 1959

2,897,407

NEGATIVE-PHASE-SEQUENCE RESPONSIVE APPARATUS

William C. Morris, Havertown, Pa., assignor to General Electric Company, a corporation of New York Application November 3, 1953, Serial No. 390,020

10 Claims. (Cl. 317—47)

The invention relates to phase sequence responsive apparatus and particularly to negative phase sequence responsive protective relays for three phase circuits in which the current in each phase may have one or more symmetrical components, namely positive - phase - sequence, negative - phase - sequence and zero - phase - sequence. Such phase sequence current components all will occur in a grounded neutral Y connected circuit in case one of the phase conductors becomes grounded.

One of the objects is to provide an improved form of phase sequence filter network for selectively energizing an electroresponsive relay or the like proportional only to the negative-phase-sequence component of one of the phase currents as segregated from the other components that may be present.

Another object is to provide an improved type of negative-phase-sequence filter having three separate phase to neutral energizing circuits.

Negative-phase-sequence current filters usually are energized from a three phase circuit, particularly of the high voltage type, by means of suitable line current transformers having Y connected secondary windings provided with a grounded neutral and are used in protective relaying systems for the line sections of electric power transmission circuits or for the generators, transformers or other electrical apparatus connected therewith in order to obtain a selective response of a particular protective relay to predetermined faults, such as unbalanced line to line or line to ground faults involving one or more of the circuit conductors. For this purpose, the negative-phase-sequence filters as heretofore developed for unbalanced fault protective service usually have required the use either of an additional residual or ground current transformer or an internal neutral in the filter network in order to eliminate the zero-sequence current component that may be present in the output of the usual grounded neutral Y connected secondary windings of the set of three line current transformers ordinarily provided at the relaying points of the circuit. This has the inherent disadvantage that when such a negative-phase-sequence filter with an internal neutral is built as an integral part of the particular protective relay energized thereby only one such protective relay can ever be used with any one set of the grounded neutral Y connected line current transformers provided at each relaying point of the circuit.

Thus, another object of the present invention is to provide a protective relay with an integral negative-phase sequence filter having three terminals for energization from the Y connected secondary windings of the usual set of three line current transformers and three terminals by means of which the neutral can be formed external to the relay thereby enabling other protective relays or measuring instruments to be energized from the same set of line current transformers that energize the negative phase sequence responsive relay. This materially simplifies the wiring of negative phase sequence protective relays of the usual drawout type that are mounted on panels along with other protective relays and measuring instruments to be energized from the same set of line current transformers.

In carrying out the present invention, a preferred form of negative-phase-sequence segregating filter network that can be built in as an integral part of the protective relay energized thereby comprises two auxiliary transformers each having a single secondary winding which are interconnected in series relation with each in parallel with and feeeding complementary impedance circuits of a phase shifting resultant voltage producing network, one circuit preferably consisting of a resistor and the other complementary circuit consisting of a resistor and a capacitor. In order to obtain three separate phase to neutral energizing circuits having three pairs of terminals, each auxiliary transformer is provided with three separate primary windings, each directly connected in series with a primary winding of the other auxiliary transformer to constitute a separate circuit between a corresponding pair of terminals. One of the primary windings of each auxiliary transformer is disposed in reverse phase relation with the other primary windings of the same transformer and provided with twice the number of turns of each of the other two primary windings. This enables each of the three primary windings of one auxiliary transformer to be provided with a separate terminal for energization, in series with other devices, if desired, from a corresponding secondary winding of the usual set of three Y connected grounded neutral line current transformers and each of the three primary windings of the other auxiliary transformer to be provided with a separate terminal for energization in series with other devices, if desired, from the neutral of the line current transformers. This improved separate phase-to-neutral energizing or input circuit terminal arrangement enables an external neutral for the interconnected primary windings of both auxiliary transformers to be formed so that other relays or meters can be energized in series therewith from the neutral of the same set of line current transformers that energize the auxiliary transformers of the negative-phase-sequence filter network.

Since in accordance with the present invention one of the primary windings of each auxiliary transformer is provided with twice the number of turns of the other two primary windings, this will insure that the voltage across the two series connected single secondary windings normally are in balance opposition and hence are zero under all balanced three phase conditions.

In further accordance with the present invention, the resistance and capacitance elements forming the two complementary impedance circuits of the resultant voltage phase shifting network are specially proportioned and interrelated so that the secondary windings of the two auxiliary transformers in parallel relation therewith serve to produce a resultant voltage due to phase shift across the impedance network and consequently across the operating winding or windings of the protective relay energized therefrom that will be proprtional only to the negative-phase-sequence component of one of the phase currents under phase unbalance or unbalanced ground fault conditions.

The improvements provided by the present invention will be better understood from the following description considered in connection with the accompanying drawing, Fig. 1 of which is a schematic diagram illustrating a preferred embodiment of the invention in a protective relaying system for a three phase generator and Figs. 2, 3, 4 and 5 are vector diagrams useful in understanding the operating principle of the improved six terminal form of negative-phase-sequence filter of the present invention.

As shown schematically in the drawing, the alternating current generator 10 is of the three phase Y connected grounded neutral type and is connected through the circuit breaker 11 having the trip winding 12 to supply power to the lines A, B and C which may be part of a power transmission system. When the generator 10 represents only a small part of the total system generation unbalanced faults may occur such that the sustained negative-phase-sequence current from the generator 10 resulting from system feedback will be much greater than the positive-phase-sequence current. Thus, when the generator is subjected to unbalanced phase or ground faults the stator current includes a negative-phase-sequence component which causes a double frequency current to flow in the rotor iron and slot wedges that may result in excessive local heating. Such heating effect on the rotor can be expressed as a function of the negative-phase-sequence current and of time. Hence the ideal relay for the protection of such a generator against such unbalanced fault is one which responds only to the negative-phase-sequence component of generator current and has a time characteristic parallel to but slightly lower than the heating characteristic of the generator.

In accordance with the present invention, the generator 10 is protected by providing the usual set of line current transformers 13 having the secondary windings 13a, 13b and 13c Y connected and provided with a grounded neutral N for energizing the improved form of negative-phase-sequence responsive relay indicated generally by the reference character 15. As schematically shown the relay 15 is provided with electroresponsive operating means of the well-known induction disk wattmetric type in which the induction disk 16 is rotated upon energization of the relay operating windings 17 (upper), 18 and 19 (lower) to carry the movable contact 20 into engagement with the stationary contact 21 and thereby energize the circuit breaker trip windings 12 from a suitable supply source indicated as plus and minus with a time delay that varies inversely with the square of the energizing current of the windings. Thus, the timing characteristic of the induction disk operating unit can be closely matched to the negative-phase-sequence current component heating characteristic of the generator 10 when the relay windings 17, 18 and 19 are energized by such component.

In order to energize the induction disk operating windings 17, 18 and 19 indicated as $Z_L$ in Fig. 1, proportionately only to the negative phase sequence component of the phase currents of generator 10, the improved form of negative-phase-sequence filter network indicated generally by the reference character 25 is provided. This filter network includes suitable magnetic coupling means comprising, for example, two auxiliary transformers 26 and 27 having their single secondary windings 28 and 29 respectively connected in series to energize the resultant voltage phase shifting impedance network having two complementary impedance circuits in series, one consisting of the resistor $R_2$ and the other Z consisting of the resistor $R_1$ and the capacitor XC. The mid-connection 30 serves to interconnect the transformer secondary winding 28 in parallel relation with the capacitor resistor part Z of the impedance circuit and the transformer secondary winding 29 in parallel with the resistor $R_2$.

Each of the auxiliary transformers 26 and 27 is provided with three primary windings 34, 35, 36 and 37, 38, 39 respectively, each connected in series with a primary winding of the other transformer for energization in a corresponding phase to neutral circuit. As indicated in the drawing the primary winding 34 and the primary winding 37 are each disposed in reverse phase relation with the other two primary windings of the same transformer and provided with twice the number of turns of each of the other two primary windings. The primary winding 34 is provided with the terminal T1 for energization from the secondary winding 13a of the line current transformers 13 and is connected in series with the primary winding 39 which is provided with the terminal T6 for energization from the neutral N of the line current transformers. Likewise the primary winding 35 is provided with the terminal T2 for energization from the secondary line current transformer winding 13b and is connected in series with the primary winding 38 which is provided with the terminal T5 for energization from the neutral N of the line current transformers. Similarly, primary winding 36 is provided with terminal T3 for energization from the secondary winding 13c of the line current transformers and is connected in series with primary winding 37 which is provided with the terminal T4 for energization from the neutral N of the line current transformers. Thus, with the improved negative-phase-sequence filter network, only the line currents Ia, Ib, Ic are required for energization thereof and the neutral N can be made up entirely external to the relay. This permits other current responsive devices such as relays or measuring instruments indicated schematically as X or Y to be included in series with the primary windings of auxiliary transformers 26 and 27 either between the line current transformers and the auxiliary transformer primary windings or between these windings and the neutral N as indicated in the drawing. This materially simplifies the wiring when the negative-phase-sequence relay 15 is to be mounted on a panel along with the other current responsive relays or instruments that are to be energized by the same line currents Ia, Ib and Ic that are supplied by the set of line current transformers 13 having the secondary windings 13a, 13b, 13c Y connected with the neutral grounded.

It can be readily shown both by vector analysis and by means of the theory of symmetrical components that the improved negative-phase-sequence filter network shown in Fig. 1 produces a resultant voltage to energize the relay operating windings 17, 18 and 19 designated as $Z_L$ proportionally only to the negative-phase-sequence component of the line current in phase A. This result may be obtained, with the particular impedance network that has been illustrated in the drawing by way of example, when the elements of the impedance network have the following relationship:

$$R_1 = 0.5R_2$$
$$X_C = -j0.866R_2$$
$$Z = 0.5R_2 - j0.866R_2$$
$$Z = R_2 \underline{|-60°}$$

If the auxiliary current transformer turns ratio is K' the secondary currents $I_X$ and $I_Y$ can be expressed as follows:

$$I_X = \frac{1}{K'}(2Ia - Ib - Ic) \quad (1)$$

$$I_Y = \frac{1}{K'}(2Ic - Ib - Ia) \quad (2)$$

For the balanced three-phase condition where $$Ia + Ib + Ic = 0$$

as indicated in Fig. 2, it can be shown by vectors (see Figs. 3 and 4) that:

$$I_X \alpha 3Ia$$
$$I_Y \alpha 3Ic$$

Assume for the moment that the circuit through the induction-disk unit coil is open. The current $I_X$ flowing through the capacitive branch Z results in a voltage drop which lags the current by 60°, and the current $I_Y$ flowing in the resistive branch $R_2$ results in a voltage drop in phase with the current. As shown in Fig. 5 these voltages will be 180° apart and since Z and $R_2$ are equal in magnitude and $Ia = Ic$, the resultant voltage across the network will be zero. Consequently when the relay unit is connected across the impedance network no current will flow in its coils for balanced three-phase condition.

Any unbalance in the line currents will upset this vector relationship and cause current to flow in the relay operating coils. This current will be proportional to the negative-phase-sequence component of line current for the following reasons:

Any zero phase-sequence current resulting from the unbalance will be eliminated by the auxiliary current transformers. The positive-phase-sequence component will not flow in the relay coils since it has already been shown that with a balanced three-phase load there will be no voltage across the network.

This conclusion can be proved more vigorously by symmetrical component theory.

By the superposition theorem the currents $I_X$ and $I_Y$ will divide between the network impedance and the relay $(Z_L)$ so that the relay current can be expressed as follows:

$$I_L = \frac{ZI_X}{Z+R+Z_L} + \frac{RI_Y}{Z+R+Z_L} \quad (5)$$

Resolving the currents $Ia$, $Ib$, and $Ic$ into their symmetrical components:

$$Ia = Ia_1 + Ia_2 + Ia_0 \quad (6)$$
$$Ib = a^2 Ia_1 + a Ia_2 + Ia_0 \quad (7)$$
$$Ic = a Ia_1 + a^2 Ia_2 + Ia_0 \quad (8)$$

Substituting into (1) and (2):

$$I_X = \frac{1}{K}\Big[(2Ia_1 + 2Ia_2 + 2Ia_0 - a^2 Ia_1 - a Ia_2 - Ia_0 - a Ia_1 - a^2 Ia_2 - Ia_0)\Big] \quad (9)$$

$$I_Y = \frac{1}{K}\Big[(2a Ia_1 + 2a^2 Ia_2 + 2Ia_0 - a^2 Ia_1 - a Ia_2 - Ia_0 - Ia_1 - Ia_2 - Ia_0)\Big] \quad (10)$$

It is apparent from these expressions that the $Ia_0$ terms cancel, and that consequently the relay will be insensitive to the zero sequence component of a fault current.

Substituting these values of $I_X$ and $I_Y$ into Equation 5:

$$I_L = \frac{1}{K}\left[\frac{(2Ia_1 + 2Ia_2 - a^2 Ia_1 - a Ia_2 - a Ia_1 - a^2 Ia_2)Z}{Z+R+Z_L} + \frac{(2a Ia_1 + 2a^2 Ia_2 - a^2 Ia_1 - a Ia_2 - Ia_1 - Ia_2)R}{Z+R+Z_L}\right] \quad (11)$$

$$I_L = \frac{1}{K}\left[\frac{Ia_1(2Z - a^2 Z - aZ + 2aR - a^2 R - R) + Ia_2(2Z - aZ - a^2 Z + 2a^2 R - aR - R)}{Z+R+Z_L}\right] \quad (12)$$

But: $Z = -aR$

Therefore:

$$I_L = \frac{1}{K}\left[\frac{Ia_1(-2aR + R + a^2 R + 2aR - a^2 R - R) + Ia_2(-2aR + a^2 R + R + 2a^2 R - aR - R)}{-aR + R + Z_L}\right] \quad (13)$$

Since the coefficient of $Ia_1 = 0$:

$$I_L = \frac{1}{K}\left[\frac{Ia_2(3a^2 R - 3aR)}{Z_L + R(1-a)}\right] = \frac{1}{K}\left[\frac{3R(a^2-a)}{Z_L + R(1-a)}\right] Ia_2 = k Ia_2$$

Thus the current which flows in the relay operating coils 17, 18 and 19 indicated as $Z_L$ will be proportional to the negative-sequence current only.

If desired an electroresponsive unit may be provided for sounding an alarm when the generator 10 is subjected to negative-phase-sequence current below the minimum value at which the protective relay 15 is set to respond. For this purpose the operating winding 40 of the alarm unit may be connected to be energized through the full wave rectifiers 41 in parallel with the lower windings 18 and 19 of the induction disk operating means. Preferably the adjustable resistor 20 is connected in series with the induction disk operating windings 17, 18 and 19 and the adjustable resistor 42 is connected in series with the alarm operating winding 40 in order to control the relative sensitivity thereof. The full wave rectifiers 41 may be protected from damage by transient voltage surges which may occur during a severe fault by interconnecting a stack of resistors 43 having negative voltage resistance characteristics in parallel with the rectifying elements. Thus, the operating winding 40 of the electroresponsive alarm unit will be energized proportionately to the negative-phase-sequence component supplied by the improved filter 25.

What I claim as new and desire to secure by Letters Patent of the United States is:

1. A filter for segregating the negative-phase-sequence components of three-phase currents, comprising a resultant voltage producing network having complementary impedance phase shifting circuits in series, three separate phase-to-neutral energizing circuits, and magnetic coupling means connected between each of said energizing circuits and each of said impedance circuits.

2. A protective relay having an integral negative-phase-sequence filter network including a pair of interconnected auxiliary transformers, each having a single secondary winding and one having three primary windings, each provided with a terminal adapted for energization in series with other devices from the corresponding secondary winding of a set of three-phase line current transformers interconnected in Y, and the other having three primary windings, each interconnected with a corresponding primary winding of the other auxiliary transformer and provided with a terminal adapted for energization in series with other devices from the neutral of the Y, and having electroresponsive relay operating means and complementary phase shifting impedance circuits interconnected with the secondary windings of the auxiliary transformers to energize the operating means proportional only to the negative-phase-sequence component of the phase currents.

3. A phase sequence responsive apparatus comprising a first auxiliary transformer having one secondary winding and three primary windings each provided with a terminal for energization from a corresponding secondary winding of a set of three phase current transformers interconnected in Y, a second auxiliary transformer having one secondary winding connected in series with the secondary winding of the first auxiliary transformer and three primary windings each connected in series with a corresponding primary winding of the first auxiliary transformer and provided with a terminal for energization from the neutral of the Y connected secondary windings, and electroresponsive means provided with a filter network interconnecting the secondary windings of the auxiliary transformers and the electroresponsive means to energize the electroresponsive means proportionately only to the negative-phase-sequence component of the phase currents.

4. A phase sequence filter having three phase to neutral circuits comprising an impedance network and a pair of transformers, each transformer having a single secondary winding interconnected with the impedance network and each transformer having three primary windings, each connected in series with a primary winding of the other transformer for energization in accordance with a corresponding phase to neutral current and each transformer having one primary winding provided with twice the number of turns of the other primary windings.

5. A phase sequence filter having separate phase to neutral circuits comprising an impedance network and a pair of transformers, each transformer having a single secondary winding interconnected with the impedance network and each transformer having three separate primary windings, each disposed in opposite phase relation with at least one primary winding of the same transformer and connected in series with a primary winding of the other transformer for energization in accordance with a corresponding phase to neutral current, and each transformer having one primary winding provided with twice the number of turns of the other primary windings.

6. A phase sequence filter having three phase to neutral circuits comprising a network having complementary impedance circuits in series relation one including a resistor and the other including a resistor and a capacitor, a pair of transformers each having a single secondary winding connected with the network in series relation with the secondary winding of the other transformer for energizing a corresponding circuit of said network, and each of said transformers having three primary windings, each connected in series relation with a primary winding of the other transformer and one primary winding of each transformer being disposed in reverse phase relation with the other two primary windings of the same transformer and provided with twice the number of turns of each of the other two primary windings.

7. A polyphase apparatus comprising, three separate energizing circuits, each having a pair of terminals adapted to be connected between a different secondary winding of a set of three-phase Y-connected current transformers and the neutral of said set, a resultant voltage producing network having complementary phase shifting circuits, means inductively coupling each of said complementary circuits with each of said energizing circuits, whereby the resultant voltage produced across said network is proportional only to the negative-phase-sequence component of the currents in the transformer windings, and electroresponsive operating means connected across said network for energization by said resultant voltage.

8. A filter for segregating the negative-phase-sequence components of three-phase currents comprising, a resultant voltage producing network having first and second individual impedance circuits connected in series, the magnitudes of the impedances of said individual circuits being equal to each other and said first circuit including a sufficient reactive component to introduce a 60 degree phase shift in the impedance of said first circuit with respect to the impedance of said second circuit, three separate phase-to-neutral energizing circuits, and magnetic coupling means connected between each of said energizing circuits and each of said individual impedance circuits.

9. In a phase sequence filter having three phase-to-neutral circuits, a network comprising two series connected impedance circuits, the impedance of one of said impedance circuits being equal in magnitude to but displaced 60 degrees from the impedance of the other of said impedance circuits, and a pair of transformers, each of said transformers having a secondary winding interconnected with a different one of said impedance circuits and having three primary windings, each of said primary windings being connected in series with a different one of the primary windings of the other transformer for energization in accordance with a corresponding phase-to-neutral current, and each of said transformers having one primary winding provided with twice the number of turns of the other primary windings.

10. In a phase sequence filter having separate phase-to-neutral circuits, a network having complementary impedance circuits connected in series relation, one of said impedance circuits including a resistor having R ohms resistance and the other impedance circuit including a resistor having 0.5R ohms resistance and a capacitor having 0.866R ohms reactance, and a pair of transformers, each of said transformers having a single secondary winding interconnected with a different one of said impedance circuits and having three separate primary windings, each of said primary windings disposed in opposite phase relation with at least one of the primary windings of the associated transformer and being connected in series with one of said primary windings of the other transformer for energization in accordance with a corresponding phase-to-neutral current, and each of said transformers having one primary winding provided with twice the number of turns of the other primary windings.

References Cited in the file of this patent

UNITED STATES PATENTS

| | | |
|---|---|---|
| 1,726,928 | Sleeper et al. | Sept. 3, 1929 |
| 2,161,829 | Lenehan | June 13, 1939 |
| 2,309,649 | Lenehan | Feb. 2, 1943 |
| 2,315,470 | Warrington | Mar. 30, 1943 |
| 2,381,527 | Traver | Aug. 7, 1945 |
| 2,456,976 | McConnell | Dec. 21, 1948 |
| 2,516,022 | Sonnemann | July 18, 1950 |
| 2,516,025 | Sonnemann | July 18, 1950 |